Figure 1:
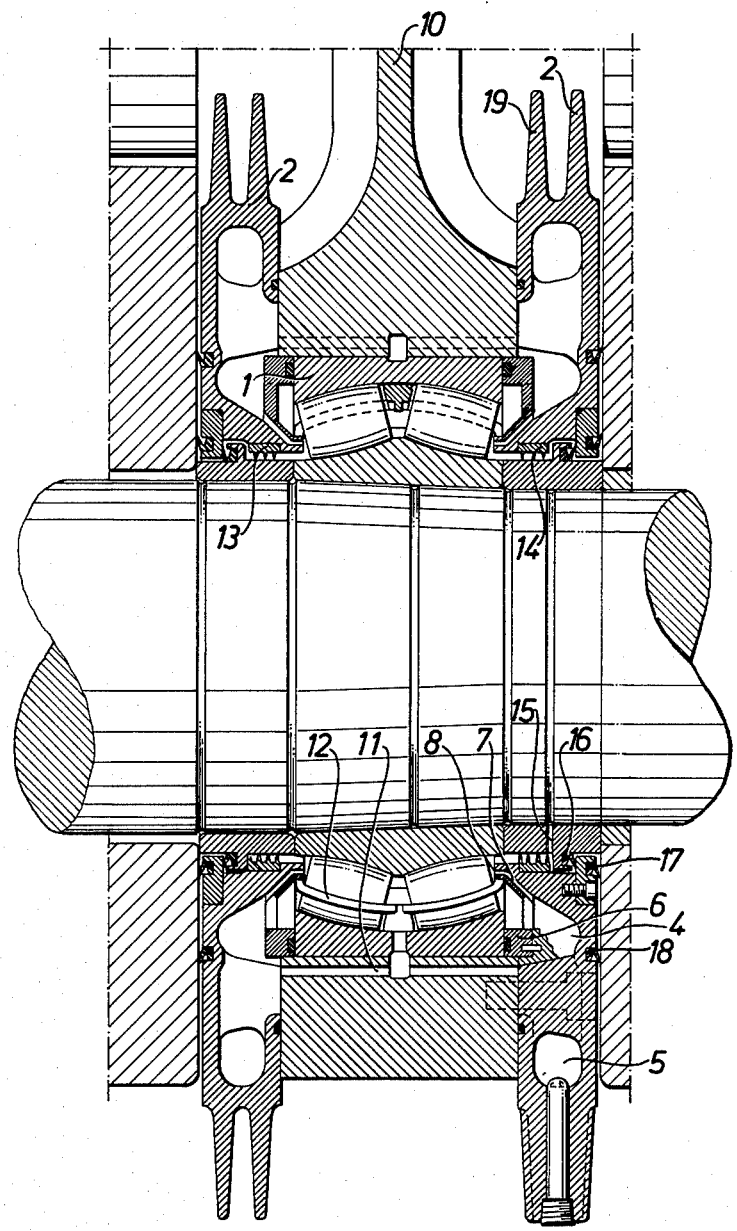

United States Patent [19]
Edström

[11] 4,230,379
[45] Oct. 28, 1980

[54] ANTIFRICTION BEARING CONSTRUCTION

[75] Inventor: Sören E. H. Edström, Uppsala, Sweden

[73] Assignee: Kockums Industri Aktiebolag, Sweden

[21] Appl. No.: 961,688

[22] Filed: Nov. 17, 1978

[30] Foreign Application Priority Data

Nov. 17, 1977 [SE] Sweden .............................. 7712980

[51] Int. Cl.³ ............................................ F16C 33/66
[52] U.S. Cl. .................................... 308/187; 308/214
[58] Field of Search ....... 308/187, 194, 214, DIG. 14, 308/76–78, 240

[56] References Cited
U.S. PATENT DOCUMENTS

| | | | |
|---|---|---|---|
| 2,926,052 | 2/1960 | Cain | 308/187 |
| 3,019,065 | 1/1962 | Neeley | 308/187 |
| 3,698,777 | 10/1972 | McCoy | 308/187 |
| 4,120,541 | 10/1978 | Schiemann | 308/187 |

Primary Examiner—Frederick R. Schmidt
Attorney, Agent, or Firm—Hill, Van Santen, Steadman, Chiara & Simpson

[57] ABSTRACT

A roller bearing construction is provided for use between a crank-shaft and a connecting rod wherein the bearing assembly has lubricating oil sealed therein. In such application, centrifical force causes oil to move in a circular pattern tending to take a position radially remote from the inner race. Internal walls or baffles are provided that partially break up such oil movement, the walls or baffles being so constructed that some of the oil can pass therethrough to an adjacent compartment and other oil is directed through a channel to discharge near the inner race. Appropriate seals and heat dissipation means are included in the bearing assembly.

2 Claims, 2 Drawing Figures

ANTIFRICTION BEARING CONSTRUCTION

BACKGROUND OF THE INVENTION

1. Field of the Invention

This invention relates to an antifriction bearing construction and more particularly to the lubrication of an antifriction bearing of the type which in operation has its axis performing an orbital movement, such as an antifriction bearing assembly for journalling the connecting rod on the crank shaft in a gang saw.

In an antifriction bearing which in addition to the rotation around its own axis also is moved in an orbital movement around another axis, the lubricant is subjected to centrifugal forces of varying magnitudes and directions. Generally, the lubricant is centrifuged out to the outer race of the bearing in which case the lubrication of the bearing portions closer to the rotational axis is jeopardized. At the same time, due to the centripetal acceleration, there are great forces on the roller bodies and the roller cage. As these forces have to be reacted to by surfaces within the bearing where the load carrying ability is limited and the lubrication conditions are unfavorable, the result is generally high friction, a great heat development and considerable wear.

In many applications, such as in gang saws, the bearing assembly cannot be encapsulated in a crank-shaft housing, thereby making it impossible to use a conventional method of circulation of lubrication, i.e. using a pump for the delivery of lubricant and free return flow to a tank or sump.

SUMMARY OF THE INVENTION

In order to provide for an improvement in these respects, the lubrication should be carried out by means of oil (not grease) which circulates through the bearing in such a manner that a strong film of lubricant is formed between the loaded surfaces at the same time that an effective dissipation of the heat developed from friction takes place.

The present invention eliminates the above mentioned problems. This result is achieved by lifting the oil towards the central portions of the bearing so that the load carrying portions of the bearing are adequately lubricated, and by improving the heat dissipation ability of the bearing. A contribution to the elimination of the above mentioned problems is also achieved by the provision of effective sealing means to keep the lubricating oil within the housing of the bearing despite the action of the centrifugal force.

For a fuller understanding of the invention reference may be had to the following description of a preferred embodiment illustrated on the accompanying drawings.

ON THE DRAWINGS

Figure 2:
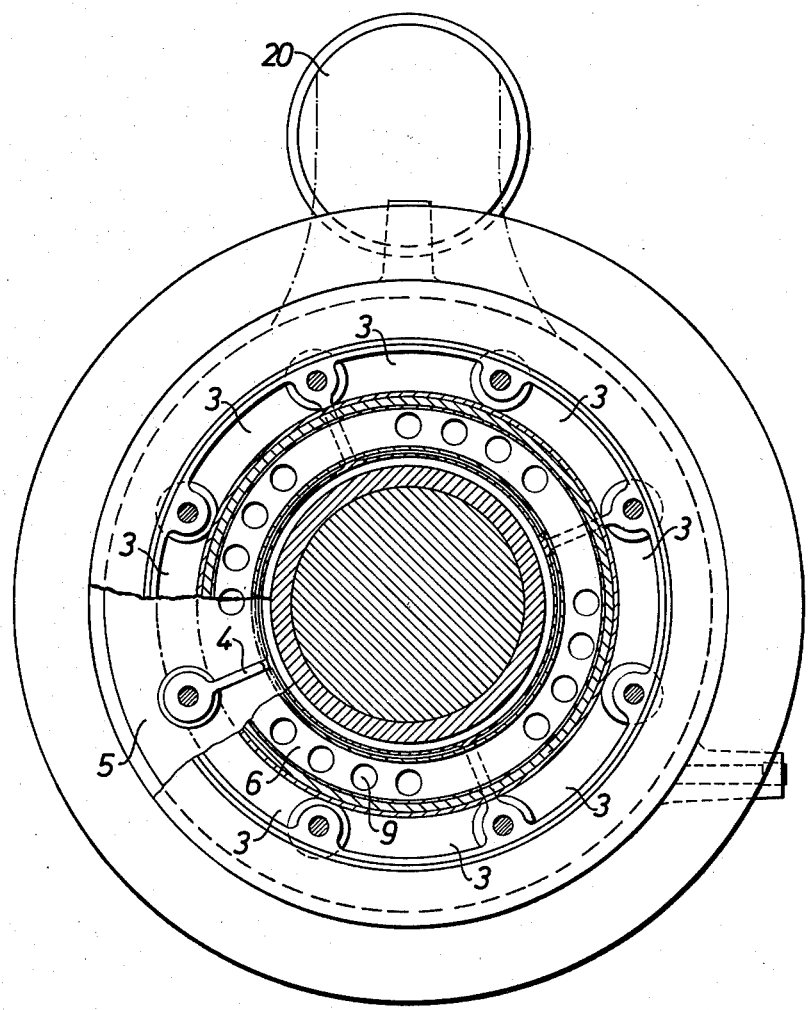

FIG. 1 is an axial, vertical section of an antifriction bearing construction embodying the invention; and FIG. 2 is an end view of the antifriction bearing construction of FIG. 1, partly in section and in reduced scale.

AS SHOWN ON THE DRAWINGS

The antifriction bearing, generally denoted 1, is held in its place by a pair of bearing shields 2. Each one of the bearing shields comprises a plurality of compartments 3 (FIG. 2), defined in part by a series of radial walls 4. The compartments 3 are in communication with each other through a series of holes 5. By means of an insert 6 there are formed, in each one of the bearing shields, a number of channels 7 which extend toward the axis of the bearing and open slightly inwardly of a side 8 of the bearing. The inserts 6 are at suitable points provided with a number of holes 9 for return flow of oil from the bearing to the oil space outside the inserts. Also a connecting rod 10 has a pair of return flow channels 11. The housing of the bearing is filled with oil to such an extent that the lowermost rollers are just below the oil level in rest position.

In operation the conditions will be such that as a crank shaft 20 has revolved one turn around its axis then also the centrifugal force has revolved one turn in relation to the connecting rod (and in relation to the outer race of the bearing). The free oil level strives to take a position perpendicular to the direction of the centrifugal force. Only applications where the centrifugal force is several times greater than the force of gravity are of interest in the present case. Because the direction of the centrifugal force is revolving, the oil strives to circulate in the channel around the bearing. Thereby flow losses are encountered and the free oil level forms an inclined level in relation to a plane perpendicular to the direction of the centrifugal force (radially from the crank shaft axis). (If there were a smooth ring-shaped room or annular cavity there would be formed a well defined oil quantity which would revolve all the time in the outer periphery of the ring. Thereby the oil would reach only the outer race of the bearing whereas the innermost portions would be lubricated insufficiently. Furthermore, the actual oil level would become very critical in as much as a small decrease of the oil level would cause the bearing to operate completely dry. An excessive filling, on the other hand, would result in unacceptable great splash losses with inherent heating. In such a construction the sealing of the bearing also becomes more difficult.)

According to the present invention the ring-shaped room or annular space has been divided into a plurality of compartments. The communication between these compartments may take place through the holes 5 and via the channels 7 which discharge the oil within the bearing. (If there were no holes 5, the entire oil flow would be compelled to pass over the edge at 8 and pass further on through the bearing. Further, the result would be a "rain of oil" in all direction within the bearing housing—with severe sealing problems as a consequence.)

By an appropriate dimensioning of the relative sizes of the holes 5 and the cross-sectional area of the channels 7, it is possible to ensure that an optimal quantity of oil circulates through the bearing. As this oil is injected inwardly of a roller cage 12, a very efficient lubrication of the guide surfaces of the roller cage is ensured, both with respect to the rollers and with respect to the outer race. (An outer race centered roller cage is necessary in the bearings which are of interest in the present case).

As time passes by, the oil will contain some abraded particles, most of which contain iron. Such particles are effectively centrifuged outwardly towards the periphery of the ring where they may be picked up by means of a magnet. In this manner a self cleaning of the oil within the antifriction bearing construction is ensured which is essential to obtain long service intervals.

The bearing is sealed off by means of a combination of a thread seal and a lip seal. Closest to the bearing are the thread seals 13 and 14 which are of left hand and right hand design, respectively, so that the pumping direction is always inwardly towards the bearing. The pumping action is amplified by the centrifugal force which revolves in the same direction as the shaft. Outside one of the thread seals, there is disposed a deaeration channel or vent 15 to prevent any build up of pressure within the bearing housing. A double-sided lip seal 16 prevents oil that may have passed the thread seal 13, 14 from leaking further out. A pair of outer lip seals 17 and 18 prevent foreign particles from the entering the bearing from outside.

The bearing shields 2 are manufactured from light metal to ensure that they are light and posses a high heat conductivity and each has a pair of flanges 19 to enhance the heat dissipation from the bearing. An advantageous consequence of the improved internal cooling of the bearing and the increased heat dissipation ability of the bearing housing is that the bearing may be operated with a reduced play or clearance which reduces the impact strains and eliminates the problems which are normally caused by the irregular motions of the rollers in the unloaded zones of the bearing.

I claim as my invention:

1. An antifriction bearing assembly comprising:
   (a) an annular outer race adapted to be supported for orbiting about an axis remote therefrom;
   (b) an inner annular race disposed in said outer race and defining an annular lubricant-receiving space therewith;
   (c) antifriction bearing elements disposed between said races in engagement therewith;
   (d) wall means in fluid-tight relation to said outer race and orbital therewith, said wall means having separate inner compartments in fluid communication with each other, and in fluid communication with said annular lubricant-receiving space, said compartments being defined in part by radially extending circumferentially spaced flanges secured to said wall means; and
   (e) a series of inserts secured to said wall means which respectively define with inner surfaces of said compartments a series of lubricant channels opening toward each other into the annular lubricant-receiving space, and said inserts also having a plurality of lubricant holes therethrough for conducting lubricant from the bearing elements to a reservoir in communication with said inner compartments.

2. An antifriction bearing construction as claimed in claim 1 wherein said lubricant channels in said wall means open into the annular lubricant-receiving space inwardly of the lateral surfaces of the outer and inner races.

* * * * *